United States Patent [19]

Suszylo

[11] 4,327,255

[45] Apr. 27, 1982

[54] KEYPAD CALLER FOR A TELEPHONE SET

[75] Inventor: Jacky Suszylo, Bagneux, France

[73] Assignee: Compagnie Industrielle des Telecommunications Cit-Alcatel, Paris, France

[21] Appl. No.: 208,102

[22] Filed: Nov. 18, 1980

[30] Foreign Application Priority Data

Nov. 23, 1979 [FR] France .................. 79 28900

[51] Int. Cl.³ .................................. H04M 1/50
[52] U.S. Cl. .................. 179/90 K; 340/365 E
[58] Field of Search ........... 179/90 K, 84 VF, 90 R; 340/365 E, 365 B

[56] References Cited

U.S. PATENT DOCUMENTS

| | | | |
|---|---|---|---|
| 3,648,202 | 3/1972 | Schazkwisk | 179/90 K |
| 3,971,896 | 7/1976 | Sekiguchi | 179/84 VF |
| 3,978,474 | 8/1976 | Engstrom | 340/365 E |
| 4,007,459 | 2/1977 | Hazelbarger | 179/90 K |
| 4,086,588 | 4/1978 | Kawanabe et al. | 340/365 E |
| 4,196,318 | 4/1980 | Nelson | 179/84 VF |

*Primary Examiner*—Gerald L. Brigance
*Attorney, Agent, or Firm*—Sughrue, Mion, Zinn, Macpeak & Seas

[57] ABSTRACT

A keypad caller which can be fitted into a conventional telephone set, includes a two-frequency oscillator (50) which emits two sinusoidal frequencies chosen from eight when a key (1, ... 0) is depressed thereby selecting the frequency-determining resistors of the oscillator (50) and switching the (V+,V−) voltage supply to the oscillator 50 as well as switching a double switch (Q10, Q11) which switches the speech current.

Applications: telephone telecommunications.

1 Claim, 2 Drawing Figures

KEYPAD CALLER FOR A TELEPHONE SET

The present invention relates to a keypad for an automatic telephone set and in particular to a keypad unit for use with a composite signal comprising the sum of two sinusoidal VF signals which serve to designate the called subscriber.

BACKGROUND OF THE INVENTION

It is known to use voice frequency keypads that operate by pressure on a key causing two frequencies to be emitted simultaneously. Generally they are designed to comply with Notice No. Q23 of CCITT. However, in recent prior art apparatus, digital technology methods have been used to generate these frequencies and perform the various switching operations. Digital technologies are subject to errors during transmission which are due to the bivalency of their all or nothing states.

The keypad in accordance with the invention remedies this drawback. Indeed, the method used therein is entirely analog.

SUMMARY OF THE INVENTION

The present invention provides a keysender circuit for a telephone set that includes receiver and transmitter circuits, the keysender circuit comprising a keypad having an array of push-buttons arranged, when depressed, to interconnect a row conductor and a column conductor specific to the position of the push-button in the array, a two-frequency oscillator connected to the row and column conductors of the keypad and arranged to inject a pair of audio tones to line, one of said pair of audio tones being a high frequency audio tone selected from a group of at least three high frequency audio tones and corresponding to the column of the depressed button, and the other, of said pair of audio tones being a low frequency audio tone selected from a group of at least four low frequency tones and corresponding to the line of the depressed button, the circuit further comprising first means arranged to supply power to the two-frequency oscillator when one, and only one, of said push buttons is depressed thereby avoiding power consumption in the absence of any of said push buttons being depressed and also avoiding erroneous signalling when two or more buttons are depressed simultaneously, and second means located in series with the receiver and transmitter circuits of the telephone set and arranged to reduce side tone sensitivity to the injected audio frequency tones, at least when such tones are being injected in response to a single button being depressed.

BRIEF DESCRIPTION OF THE DRAWING

The invention will be better understood on examining the example given hereinafter with reference to the accompanying drawing in which.

DESCRIPTION OF PREFERRED EMBODIMENT

Figure 1:
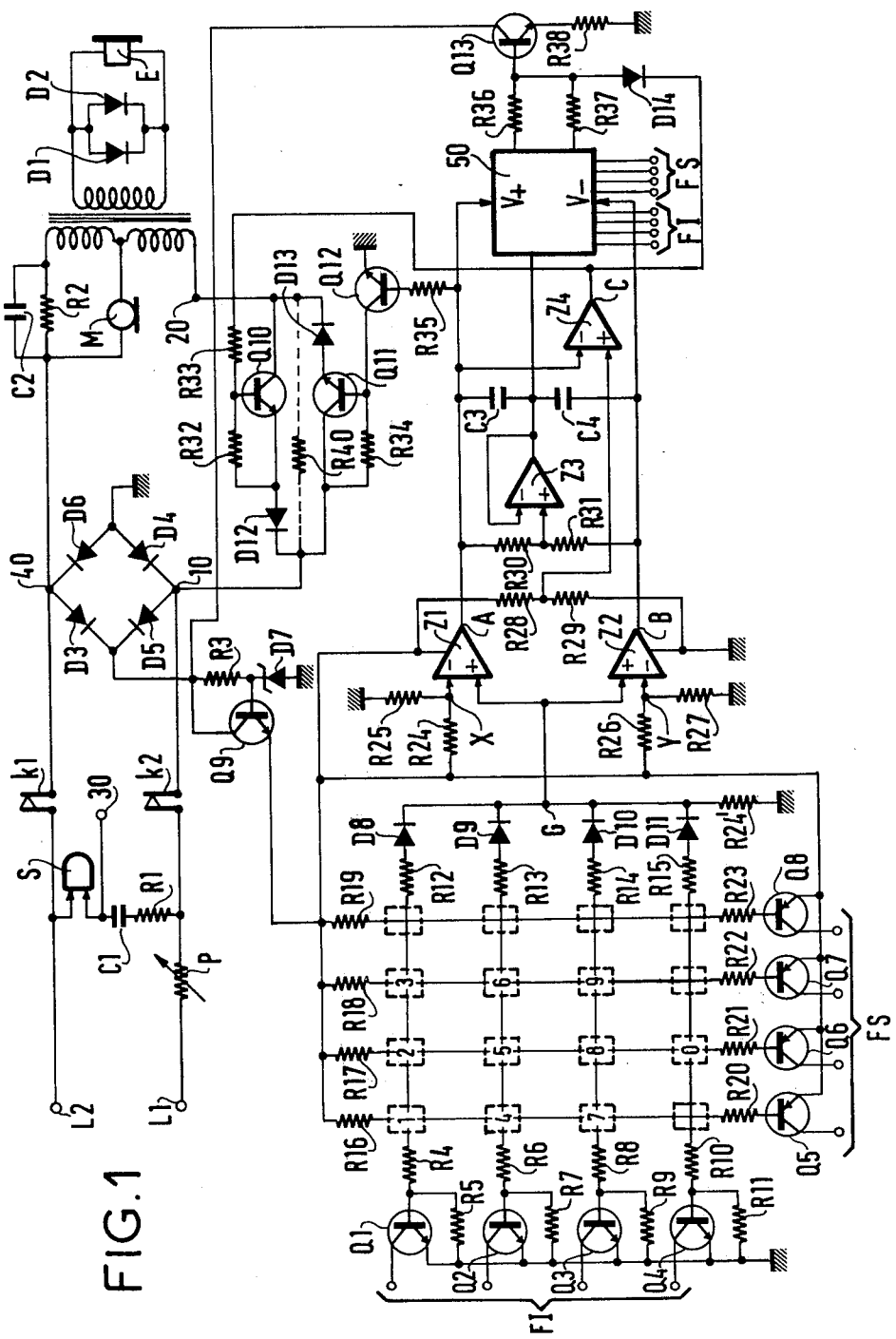
FIG. 1 is a diagram illustrating the electric and electronic operating principle of an automatic telephone set with key-calling equipment in accordance with the invention and FIG. 2 is a diagram illustrating the operating principle of the oscillator of the keypad used in said equipment.

FIG. 1 illustrates a two wire telephone having line terminals $L_1$ and $L_2$. The terminals $L_1$ and $L_2$ may be connected either way round to the positive and negative polarities needed to supply current to the telephone set. The line connected to terminals $L_1$, $L_2$ also transmits alternating ringing current, with the ringing system S of the telephone set being shown with its capacitor $C_1$ and its resistor $R_1$. The line also transmits speech currents produced by a microphone M in parallel with a primary winding of a transformer T. Speech currents are received by a receiver E in parallel with a secondary winding of the transformer T. Contacts $k_1$ and $k_2$ are operated by a gravity switch (not shown). The contacts are open in the standby position when the handset is hung up on the gravity switch and they closed when the handset is in the lifted or conversation position. A variable resistance P allows the line current to be adjusted.

All the above-mentioned units are entirely conventional and are typical of known automatic telephone sets equipped with electromechanical dials and for pulse dialling. A conventional dial would be connected to points 10, 20, 30 and 40 of the circuit shown. The invention consists in fitting a keypad caller whose keys generate frequency modulation of the line current by connecting the keypad to said points 10, 20, 30 and 40 instead of and in place of the former dial. As it turns out the point 30 (connection between the ringing systems and the capacitor CI) can be left unconnected.

The AC terminals of a fullwave rectifier bridge D3, D4, D5, D6 are connected between points 10 and 40 while its DC output terminals are connected between earth (negative polarity) and a voltage regulator constituted by a transistor Q9, a resistance R3 and a Zener diode D7. The emitter of the transistor Q9 delivers a low-impedance regulated positive voltage to the various units of the calling keypad, regardless of the polarity of the wires connected to terminals $L_1$ and $L_2$.

Said positive voltage is applied firstly to resistances R16 to R19 disposed at the ends of four columns of a switching matrix operated by depressing the possible 16 keys of the keypad, which includes in particular keys bearing the digits 1 to 9 and 0. The positive voltage is applied secondly to the emitters of PNP transistors Q5 to Q8 disposed, as are resistors R20 to R23, at the other ends of the four columns. The lines of the switching matrix include respective NPN transistors Q1 to Q4 at one end with respective resistance bridges R4 to R11. The emitters of the transistors Q1 to Q4 are connected to earth. The other ends of the lines of the matrix lead via resistors R12 to R15 and diodes D8 to D11 to a common point G connected to earth by resistance R24'.

The low-impedance regulated voltage which comes from the transistor Q9 is divided firstly by a bridge R24-R25 so as to set up a reference potential X at the inverting (−) input of a first comparator $Z_1$, the non-inverting (+) input of said first comparator $Z_1$ being connected to said point G and secondly by a bridge R26-R27 so as to set up a reference potential Y at the inverting (−) input of a second comparator $Z_2$, the non-inverting (+) input of said second comparator $Z_2$ also being connected to point G. The bridges R24-R25 and R26-R27 are so proportioned that the reference potential Y is higher than the reference potential X. The outputs of the comparators $Z_1$ and $Z_2$ are referenced A and B respectively. Output A is applied to the positive supply terminal V+ of a two-frequency oscillator 50 for supplying lower frequencies FI and upper frequencies FS under the control of the transistors Q1 to Q4 and Q5 to Q8. Output B is applied to the negative supply terminal V− of the two-frequency oscillator 50.

A divider bridge R30, R31 is disposed across outputs A and B. The mid point of said divider bridge supplies a reference potential which lies between the voltages of outputs A and B and is supplied to the + input of a linear amplifier $Z_3$ with direct negative feedback to its − input giving unity gain. The output of amplifier $Z_3$ decoupled by capacitors $C_3$ and $C_4$; is applied to the two-frequency oscillator 50 so as to supply it with a low-impedance voltage which lies between V+ and V−. The two-frequency oscillator 50 has two outputs which deliver two different sinusoidal frequency signals to two resistors R36 and R37 connected to the base of a transistor Q13 which serves as a frequency mixer and as a mixed frequency generator for modulating the line current by means of two connections with the fullwave rectifier bridge, namely, a first connection from the collector of Q13 and the positive DC output terminal of the bridge and a second connection via a resistor R38 connected to earth and hence to the negative DC output terminal of the bridge.

A comparator Z4 receives the output voltage at A via its inverting (−) input and a reference potential taken from between resistors R28 and R29 via its non-inverting (+) input. Said resistors R28 and R29 for a voltage divider chain extend between the regulated positive voltage of transistor Q9 and earth. The output C of the comparator Z4 is positive when A is negative, and negative when A is positive. These results depend on the respective values of R28 and R29 and on the values of the bridge R24-R25. The outputs A and C are connected to the inputs of a double switch circuit via transistors Q12-Q11 and transistor Q10 respectively. Transistors Q10 and Q11 are series connected with diodes D12 and D13 and, when saturated, allow the current to pass in either direction depending on the collector-emitter direction of the path taken by the current. Resistors R32-R33 associated with the base of the transistor Q10 bias said base so that when output C is negative transistor Q10 is off and when output C is positive, transistor Q10 is saturated. The circuit formed by the transistor assembly Q12-Q11 and by the resistors R34 and R35 is connected so that when Q12 is saturated Q11 is off and vice-versa. Consequently, when output A is negative, Q11 is off. The double switching circuit is disposed between the terminals 20 and 10, and a resistance R40 may be connected in parallel therewith to allow the volume of the sound to be adjusted during tone calling.

The keypad operates as follows:

1st case: Terminal L2+ and terminal L1−

(a) The handset is in the standby position. With the handset hung up, contacts k1 and k2 are open. Only the ringing system S can detect current modulation across the capacitor C1 and the resistance R1.

(b) The handset is lifted or in the conversation position. No key 1, 2 ... 0 is depressed. The contacts k1 and k2 are closed. Current flows from terminal L2 via diode D3 transistor Q9 and Zener diode D7. The switching matrix has no effect since no current flows through the lines, point G being at zero volts, transistors Q1 to Q4 being off as are transistors Q5 to Q8 because their emitters and their bases are at the same potential. In contrast differential amplifiers Z1, Z2, Z3, Z4 are supplied with current by voltage regulator Q9 as are the reference points X and Y. Consequently, when no key is depressed, outputs A and B of comparators Z1 and Z2 are at a negative potential. Indeed, the potential of G is zero and the potential of X is positive. The output potential A is at the opposite potential to that of its inverting (−) input and is therefore at the negative potential. The same applies to output B of comparator Z2. Since the potentials of A and B are negative the two-frequency oscillator 50 is off, since its positive power supply terminal V+ is at the negative potential. Output C of comparator Z4 is at the positive potential and saturates switch Q10 since. Q10 is on, speech currents flow from terminal L2 to terminal L1, passing through contact k1, microphone M, transformer T and hence receiver E, terminal 20, transistor Q10, diode D12, terminal 10, contact k2, potentiometer P and terminal L1.

(c) The handset is in the lifted position, a number is called, only one key is depressed at a time.

For example, key 5 is depressed. Where the row of key 5 crosses the column thereof, contact is made between the column and the row. The supply current provided by transistor Q9 passes through resistance R17 and through resistance R21. This sets up a potential difference between the emitter and the base of transistor Q6 since the column in contact with the row is earthed by diode D9 and by resistors R13 and R24. Transistor Q6 is consequently saturated. This allows the end of one of the frequency positions FS which control the two-frequency oscillator 50 to be brought to the low impedance level. Simulaneously, transistor Q2 is saturated via resistance R6 by the current at its base and one of the frequencies FI is generated in the two-frequency oscillator 50 by switching transistor Q2 by earthing one of the frequency positions FI via the collector-emitter of transistor Q2. Depressing a key consequently causes respective switching of each of the two resistances of the two-frequency oscillator 50 and allows one low frequency FI and one high frequency FS to be emitted.

While this action is taking place, the current in resistance R24' brings point G to a voltage higher than the voltage of the reference potential X thereby switching comparator Z1 whose output A is brought to the positive potential whereas output B of comparator Z2 remains at the negative potential.

The voltage at output A when positive as applied to the positive power supply terminal V+ of the two-frequency oscillator 50 and the voltage at output B when negative as applied to the negative terminal V− of the two-frequency oscillator 50 correspond to the normal power supply to said oscillator. The two frequencies generated by the two-frequency oscillator are mixed via resistors R36 and R37 by the current generator Q13-R38. The multifrequency current thus set up in the collector of Q13 modulates the line current by providing a variable shunt path from 40 via D3, Q13, R38, earth, D4, 10, P and back to L1. To eliminate sidetone, i.e. to limit interference at the receiver E when two frequencies are emitted, the double switch Q10-Q11 is turned off. This occurs because output A is positive and the saturated transistor Q12 turns transistor Q11 off. Further, output C is at the negative potential and transistor Q10 is off. Therefore only the frequency pair FI and FS of the code are emitted to select a digit.

(d) The handset is in the lifted position. Erroneous dialling of the number; two or more keys are depressed at the same time.

Such erroneous dialling increases the amount of current which passes through resistor R24'. The voltage developed at point G then becomes higher than the reference voltages X and Y. This causes the outputs A and B to be at a positive potential and output C to be at a negative potential. Consequently, the two frequency oscillator 50 cannot operate even though a selection of the transistors Q1 to Q8 are switched on. Since the outputs of the two-frequency oscillator 50 are also at the positive potential, the current generator Q13 consumes current on the line and to avoid this, diode D14 which is connected to output C turns transistor Q13 off. Further, the double switch Q10-Q11 is also off.

2nd case: Terminal L2− and terminal L1+

Operation remains identical to that of the first case except for the path of the line current in the lifted or conversation position.

In this case, the line current no longer passes via transistor Q10 because of the direction of diode D12 but passes via transistor Q11. The line current path is as follows: L1, P, k2, 10, Q11, D13, 20, T, M, k1 and L2.

Figure 2:
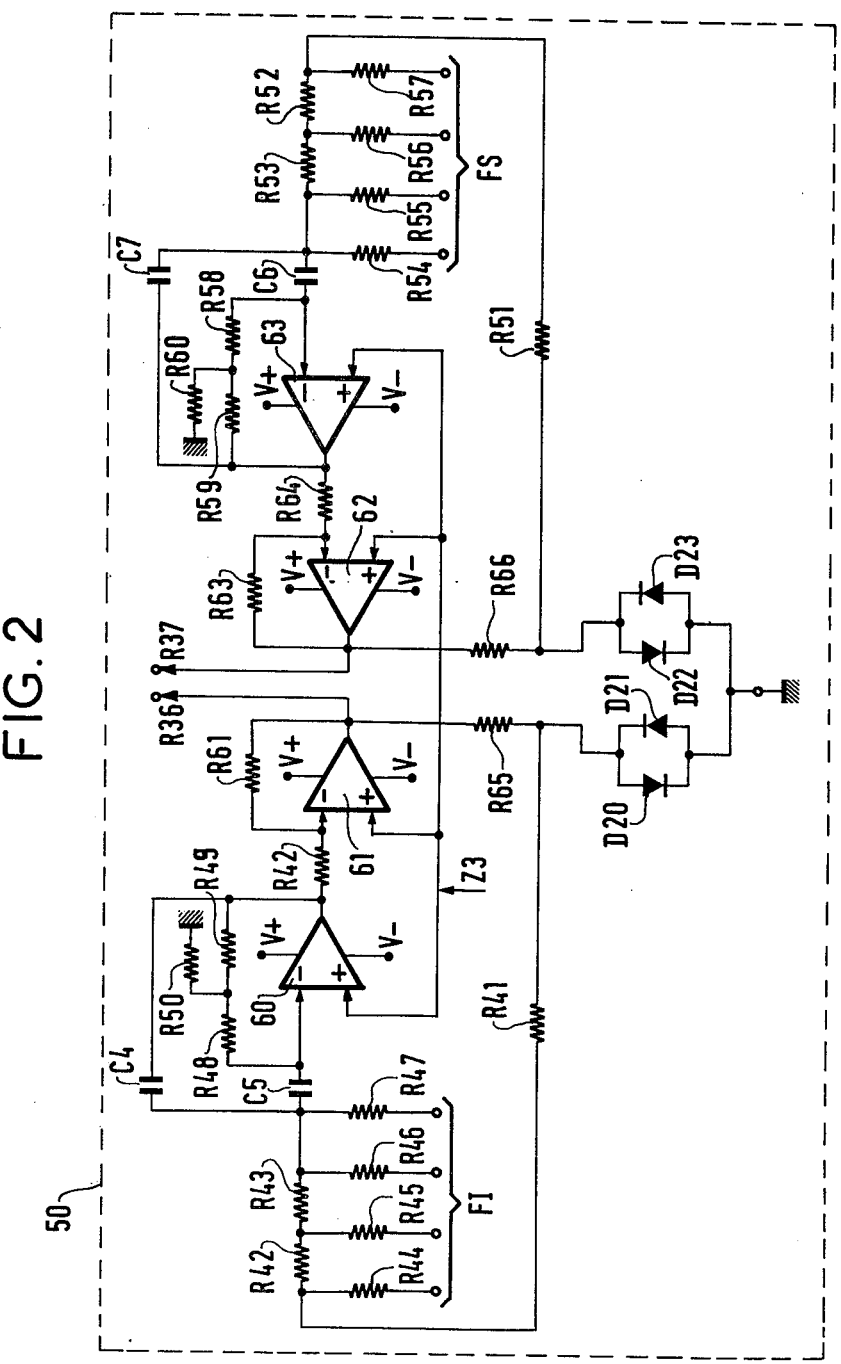

FIG. 2 shows the two-frequency oscillator 50 in detail. Said oscillator is formed by a hybrid thin layer integrated circuit built round a four operational amplifier circuit 60, 61, 62, 63. Differential amplifiers 60 and 63 are identical and together with respective RC networks R41 to R50 and C4, C5 or R51 to R60 and C6, C7 they serve to form two active multiple counter negative feedback filters. The second order transfer functions have one of the lower frequencies FI or one of the higher frequencies FS as their poles, the particular FI or FS frequency is selected by switching one of resistors R44 to R47 to earth and one of resistors R54 to R57 to the low impedance supply.

Frequencies FI are 697 Hz, 770 Hz, 852 Hz, 941 Hz.

Frequencies FS are 1209 Hz, 1336 Hz, 1477 Hz, 1633 Hz.

The function of linear amplifiers 61 and 62 is to provide a different output gain for each of them. To obtain pre-emphasis of the higher frequencies amplifier 62 has a higher output gain than amplifier 61. Another function of amplifiers 61 and 62 is to provide phase inversion necessary to make the amplifier pairs 60–61 and 62–63 operate as oscillators. With a view to stabilizing the level of the signals which are reinjected by resistances R41 and R51 diodes D20 to D23 perform double clipping of the amplitude.

The positive inputs of differential amplifiers 60, 61, 62, 63 receive their voltage from Z3. Said voltage is intermediate between the supply voltages V+ and V− necessary for producing the reference voltage. Its value is such that it minimizes the consumption of line supply current without distorting the two transmission frequencies.

The supply voltages of the amplifiers 60, 61, 62, 63 are V+ and V−. They are supplied by outputs A and B which allow two-frequency oscillation to be started. The outputs of the two-frequency oscillator 50 are connected to the resistances R36 and R37.

The keypad caller in accordance with the invention performs the various functions required by this type of apparatus and is interchangeable with that of a conventional telephone set without requiring equipment outside the telephone set or separate supply means.

I claim:

1. In a keypad caller for an automatic telephone set including a keypad with at least ten keys, each suitable for putting one column out of four in contact with one row out of four, the columns being supplied from telephone line voltage via a fullwave rectifier bridge and a voltage regulator, a ringing circuit of the set being upstream from said bridge and the microphone and receiver circuits being downstream therefrom, a two-frequency oscillator, said keypad including at one end of each of said rows a transistorized switch for earthing a corresponding resistance of said two-frequency oscillator which emits one of the four lower frequencies and including at the opposite end to the voltage regulator of each of said columns, a transistorized switch for connecting to the low impedance of said regulator a corresponding resistance of said two-frequency oscillator which further emits one of the four higher frequencies, the emission of the group of two frequencies, lower and higher, being made possible only by contact of said key, the improvement comprising:

first and second comparators, and wherein the other ends of said rows are connected to the non-inverting inputs of said first and second comparators in parallel whose inverting inputs are connected to said voltage regulator and whose respective outputs constitute a positive and negative voltage supply source of said two frequency oscillator only when a single key is depressed, said first and second comparators both supplying a negative voltage which inhibits said two-frequency oscillator when no key is depressed and both supplying a positive voltage which inhibits the two-frequency oscillator when two keys are depressed simultaneously, and a third comparator whose negative or inverting input receives the output signal from said first comparator and whose positive or non-inverting input is connected to the common point of two resistances disposed between earth and said voltage regulator, so as to deliver an on/off control voltage depending on whether at least one key is depressed or released to a first transistorized switch disposed to conduct in a first direction between the microphone-receiver and one of the wires of the telephone line and wherein said first comparator delivers an on/off control voltage depending on whether at least one key is depressed or released to a second transistorized switch disposed in parallel with said first switch to conduct in the opposite direction to said first direction, thereby providing an analog inhibiting system for the two-frequency oscillator when two keys are depressed simultaneously.

* * * * *